(12) United States Patent
Hoath

(10) Patent No.: US 10,689,307 B2
(45) Date of Patent: *Jun. 23, 2020

(54) COMPOSTING METHOD

(71) Applicant: Wilfred F. Hoath, Fort Nelson (CA)

(72) Inventor: Wilfred F. Hoath, Fort Nelson (CA)

(73) Assignee: Wilfred Hoath, Fort Nelson (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,566

(22) Filed: Feb. 5, 2019

(65) Prior Publication Data
US 2019/0169077 A1    Jun. 6, 2019

Related U.S. Application Data

(63) Continuation of application No. 15/244,271, filed on Aug. 23, 2016, now Pat. No. 10,196,321.
(Continued)

(51) Int. Cl.
    *C05F 17/05*   (2020.01)
    *C05F 3/00*    (2006.01)
    (Continued)

(52) U.S. Cl.
    CPC ............... *C05F 17/05* (2020.01); *C05F 3/00* (2013.01); *C05F 3/06* (2013.01); *C05F 17/971* (2020.01);
    (Continued)

(58) Field of Classification Search
    CPC .......... C05F 17/0009; C05F 3/00; C05F 3/06; C05F 17/0264
    See application file for complete search history.

(56) References Cited

U.S. PATENT DOCUMENTS 2,474,833 A * 7/1949 Eweson .................... C05F 3/00
                                                  71/9
4,146,382 A   3/1979 Willisch
(Continued)

FOREIGN PATENT DOCUMENTS

CA       2761494 A1    5/2013

OTHER PUBLICATIONS

"Red Worm Composting." Blog [online]. Christie, Bentley, 2015 [retrieved on Jun. 30, 2015]. Retrieved from the Internet: http://www.redwormcomposting.com/gelling-started/.
(Continued)

*Primary Examiner* — Wayne A Langel
(74) *Attorney, Agent, or Firm* — Berenato & White, LLC

(57) ABSTRACT

A method for vermicomposting includes providing an underground cell comprising a bottom, sidewalls and an open top, layering a base bedding layer at the bottom of the underground cell, layering a bottom organic waste layer on the base bedding layer, layering a stack of one (1) or more intermediate bedding layers and one (1) or more one or more intermediate organic waste layers, alternating between an intermediate bedding layer and an intermediate organic waste layer, on the bottom organic waste layer to partially form a compost heap, layering a top bedding layer on a top organic waste layer of the stack of the intermediate bedding layers and the intermediate organic waste layers to form the compost heap, watering the compost heap at a predetermined watering cycle, introducing worms to the compost heap, aerating the compost heap at a predetermined aeration cycle, and harvesting compost from the compost heap.

18 Claims, 4 Drawing Sheets

Related U.S. Application Data

(60) Provisional application No. 62/209,025, filed on Aug. 24, 2015.

(51) Int. Cl.
   *C05F 3/06* (2006.01)
   *C05F 17/971* (2020.01)

(52) U.S. Cl.
   CPC .......... *Y02A 40/205* (2018.01); *Y02A 40/208* (2018.01); *Y02P 20/145* (2015.11); *Y02W 30/43* (2015.05)

(56) References Cited

U.S. PATENT DOCUMENTS

| | | |
|---|---|---|
| 4,285,719 A | 8/1981 | Criss |
| 4,795,711 A | 1/1989 | Nockemann |
| 4,971,616 A * | 11/1990 | Glogowski ............... C05F 3/00 71/10 |
| 5,082,486 A | 1/1992 | Glogowski |
| 5,527,373 A | 6/1996 | Chareyre |
| 5,741,344 A * | 4/1998 | Warkentin ............... C05F 9/04 71/9 |
| 5,746,802 A | 5/1998 | Hagander |
| 5,811,007 A | 9/1998 | Stewart |
| 5,820,759 A | 10/1998 | Stewart |
| 6,223,687 B1 | 5/2001 | Windle |
| 6,254,654 B1 * | 7/2001 | Van Barneveld ......... C05F 9/04 71/8 |
| 7,883,885 B2 | 2/2011 | Schmidl |
| 8,465,567 B2 * | 6/2013 | Bottcher .................. C05D 9/00 71/10 |
| 10,196,321 B2 * | 2/2019 | Hoath .................. C05F 17/0009 |
| 2008/0209967 A1 | 9/2008 | Cohn |
| 2008/0287295 A1 | 11/2008 | Rubin |
| 2013/0263786 A1 | 10/2013 | Meisel, III |
| 2013/0316903 A1 | 11/2013 | Hughes |
| 2014/0026479 A1 | 1/2014 | Almeida |

OTHER PUBLICATIONS

"Composting with Redworms." Blog [online]. Washington State University, 2015 [retrieved on Jun. 30, 2015]. Retrieved from the Internet: http://whatcom.wsu.edu/ag/composl/redwormsedil.htm.

* cited by examiner

COMPOSTING METHOD

RELATED APPLICATIONS

This application is a continuation of application Ser. No. 15/244,271, filed Aug. 23, 2016, now U.S. Pat. No. 10,196,321, issued Feb. 5, 2019, which claims the benefit of U.S. Provisional Application No. 62/209,025 filed on Aug. 24, 2015, the entire disclosures of which are incorporated herein by reference.

BACKGROUND OF THE INVENTION

Field of the Invention

The present invention relates generally to the field of composting and, more particularly, to method for vermicomposting.

Background of the Invention

Composting is generally recommended as an alternative to soil. Many gardeners prefer composting over soil as it yields a greater growth rate for vegetation. Some methods of composting include black soldier fly larva composting, cockroach composting, hugelkultur composting, bokashi composting and the like. Some disadvantages in these composting methods are undesirable odor emanations, wet, soggy, or slimy heaps, and insect infestations, such as pill bugs and sow bugs. Additionally, bacteria that breaks down organic material may be severely hindered in freezing temperatures. It is therefore desirable to create a method using vermicomposting in order to greatly reduce impedance in the compost heap.

Accordingly, there exists a need for a compositing method to prevent or reduce the disadvantages described above.

SUMMARY OF THE INVENTION

The inventor has recognized the aforementioned inherent problems and lack in the art and observed that there is a need for a vermicomposting method that greatly reduce impedance in a compost heap. The development of the present invention, which will be described in greater detail herein, fulfills this need.

In one (1) embodiment, the disclosed method for vermicomposting includes the steps of: 1). providing an underground cell comprising a bottom, sidewalls and an open top, 2). layering a base bedding material layer at the bottom of the underground cell, 3). layering a bottom organic waste material layer on the base bedding material layer, 4). layering a stack of one (1) or more intermediate bedding material layers and one (1) or more intermediate organic waste material layers, alternating between an intermediate bedding material layer and an intermediate organic waste material layer, on the bottom organic waste material layer to partially form a compost heap, 5). layering a top bedding material layer on a top organic waste material layer of the stack of the intermediate bedding material layers and the intermediate organic waste material layers to form the compost heap, 6). watering the compost heap at a predetermined watering cycle, 7). introducing worms to the compost heap, 8). aerating the compost heap at a predetermined aeration cycle, and 9). harvesting compost from the compost heap, the compost comprising decomposed organic waste material, decomposed bedding material and vermicast.

In another embodiment, the disclosed compost heap includes an underground cell comprising a bottom, sidewalls and an open top, a base bedding material layer layered on the bottom within the underground cell, a bottom organic waste material layer layered on the base bedding material layer, a stack of one (1) or more intermediate bedding material layers and one (1) or more intermediate organic waste material layers, alternating between an intermediate bedding material layer and an intermediate organic waste material layer and, layered on the base bedding material layer, a top bedding material layer layered on a top organic waste material layer of the stack of the intermediate bedding material layers and the intermediate organic waste material layers, water dispersed through the top bedding material layer, the top organic waste material layer, the intermediate bedding material layers, the intermediate organic waste material layers, the bottom organic waste material layer and the base bedding material layer, and worms dispersed through the top bedding material layer, the top organic waste material layer, the intermediate bedding material layers, the intermediate organic waste material layers, the bottom organic waste material layer and the base bedding material layer to produce decomposed organic waste material and vermicast.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTIONS OF DRAWINGS

The advantages and features of the present disclosure will become better understood with reference to the following more detailed description and claims taken in conjunction with the accompanying drawings, in which like elements are identified with like symbols, and in which:

Figure 1:
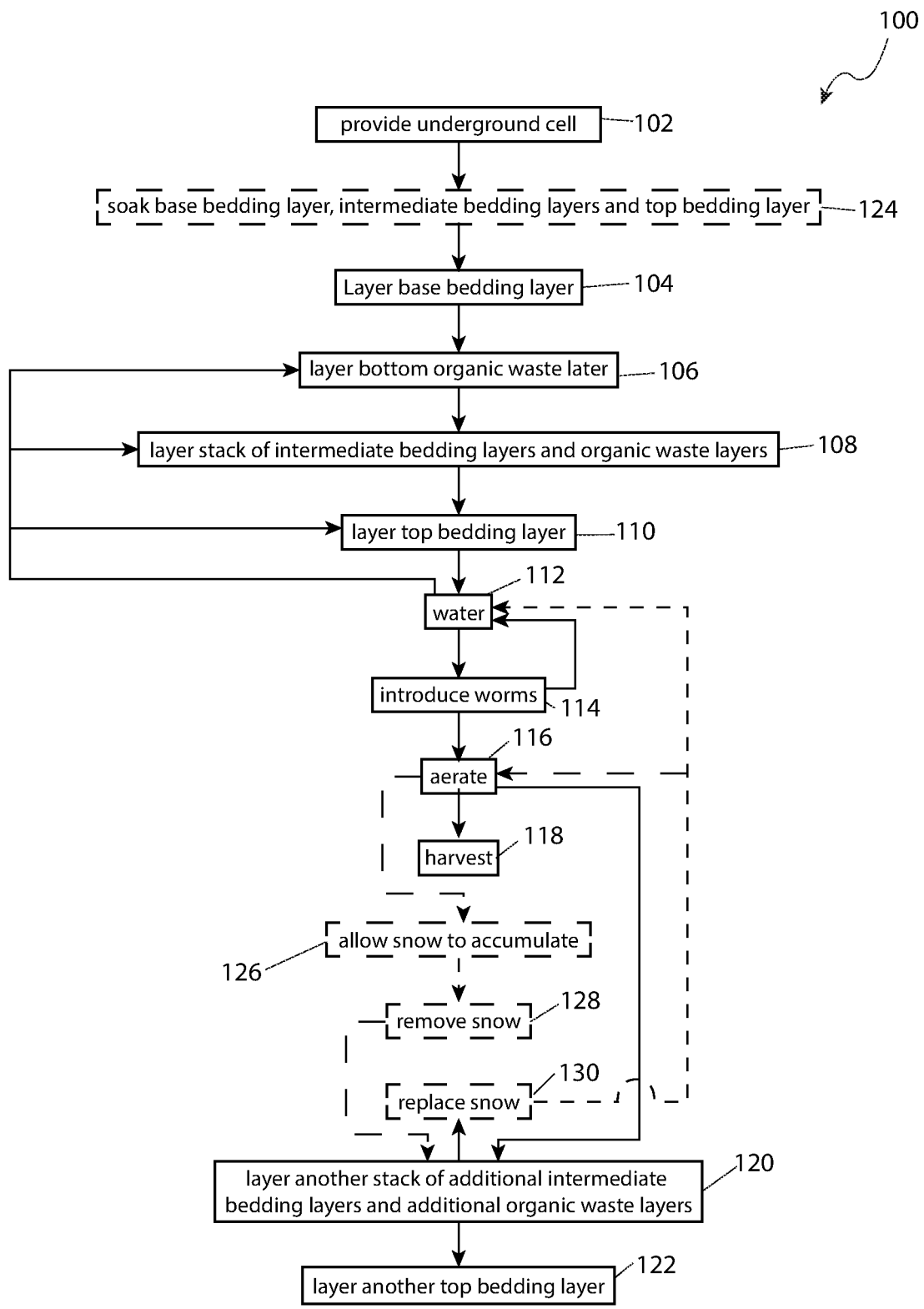
FIG. 1 is a flow diagram of one embodiment of the disclosed method for vermicomposting.

DESCRIPTIVE KEY 10 compost heap
12 composting environment
20 underground cell
22 bottom
24 sidewall
26 open top
28 excavation lane
30 bedding material layers
32 organic waste material layers
34 base bedding layer
36 bottom organic waste layer
38 intermediate bedding layers
40 intermediate organic waste layers
42 top bedding layer 44 top organic waste layer
46 bedding material
48 organic waste material
50 ground surface
52 water
54 worms
100 method

DETAILED DESCRIPTION OF THE PREFERRED EMBODIMENT

Figure 2:
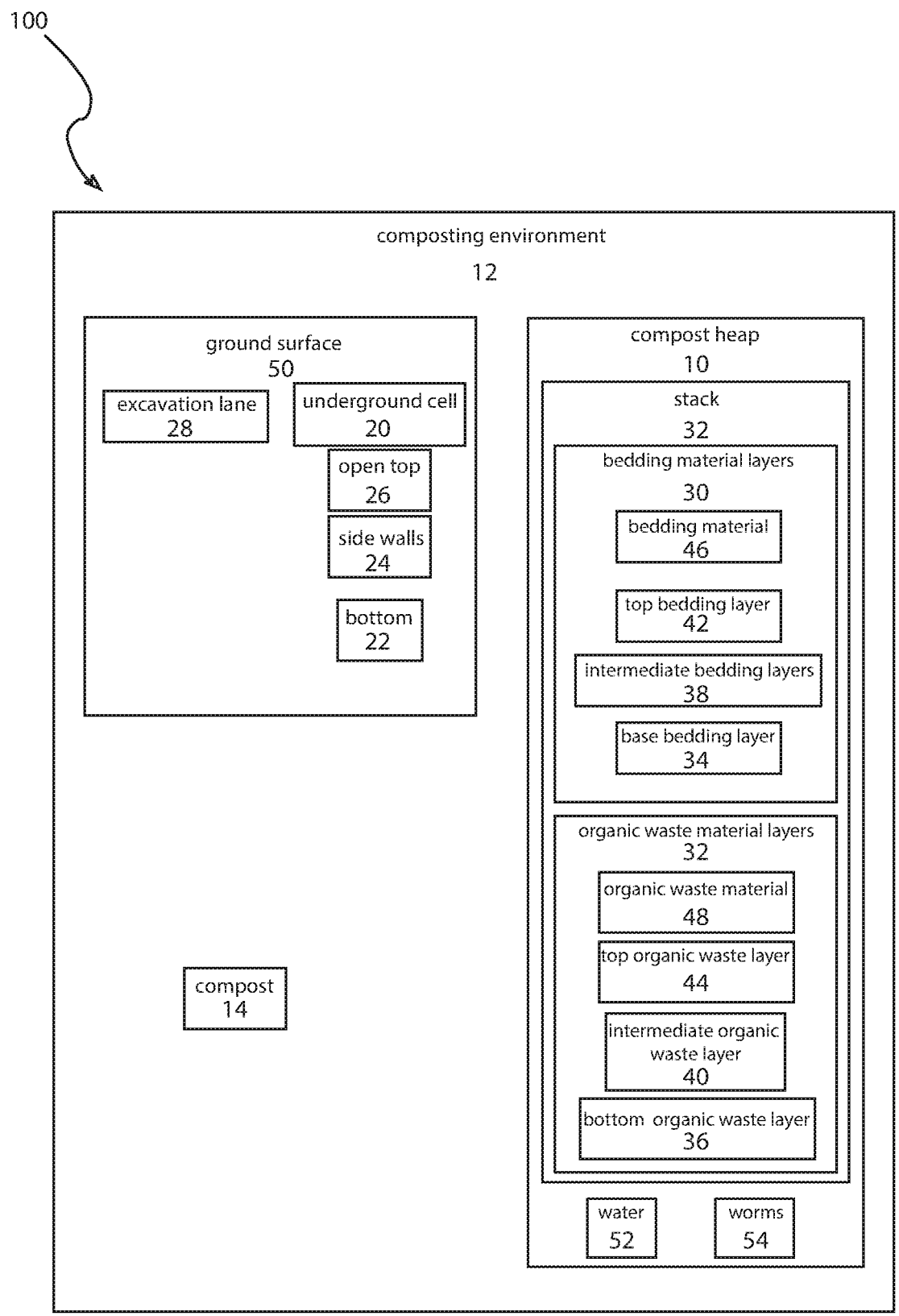
FIG. 2 is a block diagram of one (1) embodiment of a composting environment for the compost heap produced by the disclosed method.

In accordance with the invention, the best mode is presented in terms of a preferred embodiment, herein depicted within FIGS. 1 and 2. However, the invention described herein is not limited to a single described embodiment and a person skilled in the art will appreciate that many other embodiments are possible without deviating from the basic concept of the disclosure and that any such work around will also fall under its scope.

Further, those skilled in the art will recognize that other styles and configurations can be incorporated into the teachings of the present disclosure, and that the example configurations shown and described herein are for the purpose of clarity and disclosure and not by way of limitation.

As used herein, the singular terms "a", "an", and "the" do not denote a limitation of quantity, but rather denote the presence of at least one (1), as well as a plurality of, the referenced items, unless the context clearly indicates otherwise.

Referring to FIGS. 1-4, disclosed herein is a method for vermicomposting, herein generally referred to as the method 100. The method 100 may be used to produce a compost heap 10.

As used herein, the term "vermicomposting" and "vermicompost" refers to a process and product, respectively, of composting using various worms to create a heterogeneous mixture of decomposing organic waste materials, bedding materials and vermicast.

As used herein, the term "organic waste" includes any organic matter or material including, but not limited to, food, garden clippings, lawn clippings, animal based material, plant based material, animal waste (e.g., feces), human waste and any other biodegradable waste that can be broken down into simple organic molecules by worms using vermicomposting.

As used herein, the term "vermicast" refers to the end-product of the breakdown of organic waste by worms, also referred to as worm castings, worm humus or worm manure.

Figure 3:
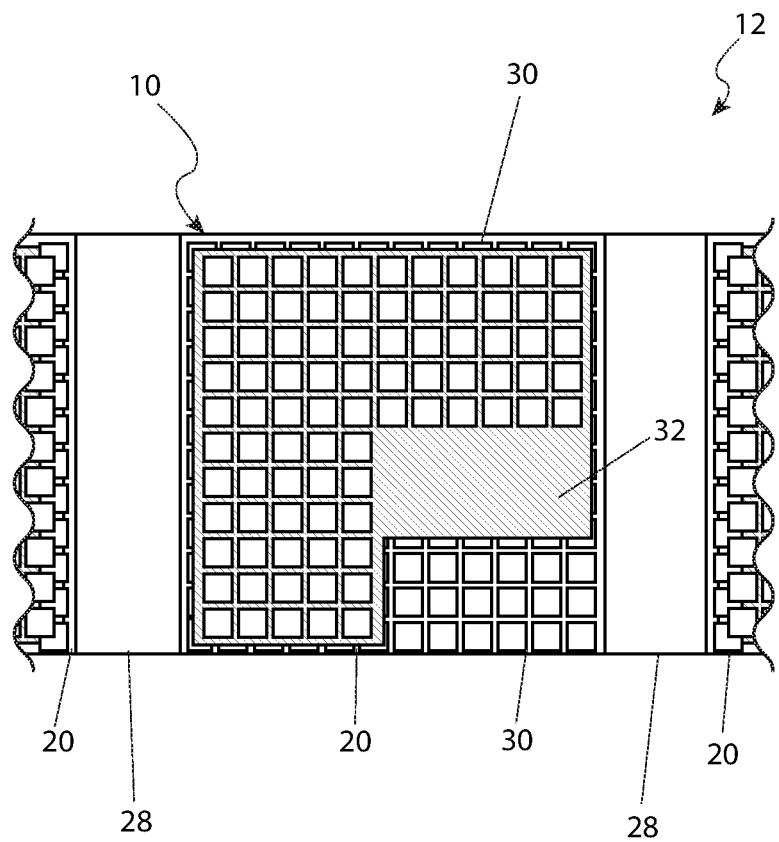
FIG. 3 is a cutaway top view of one (1) example of the compost heap.
Figure 4:
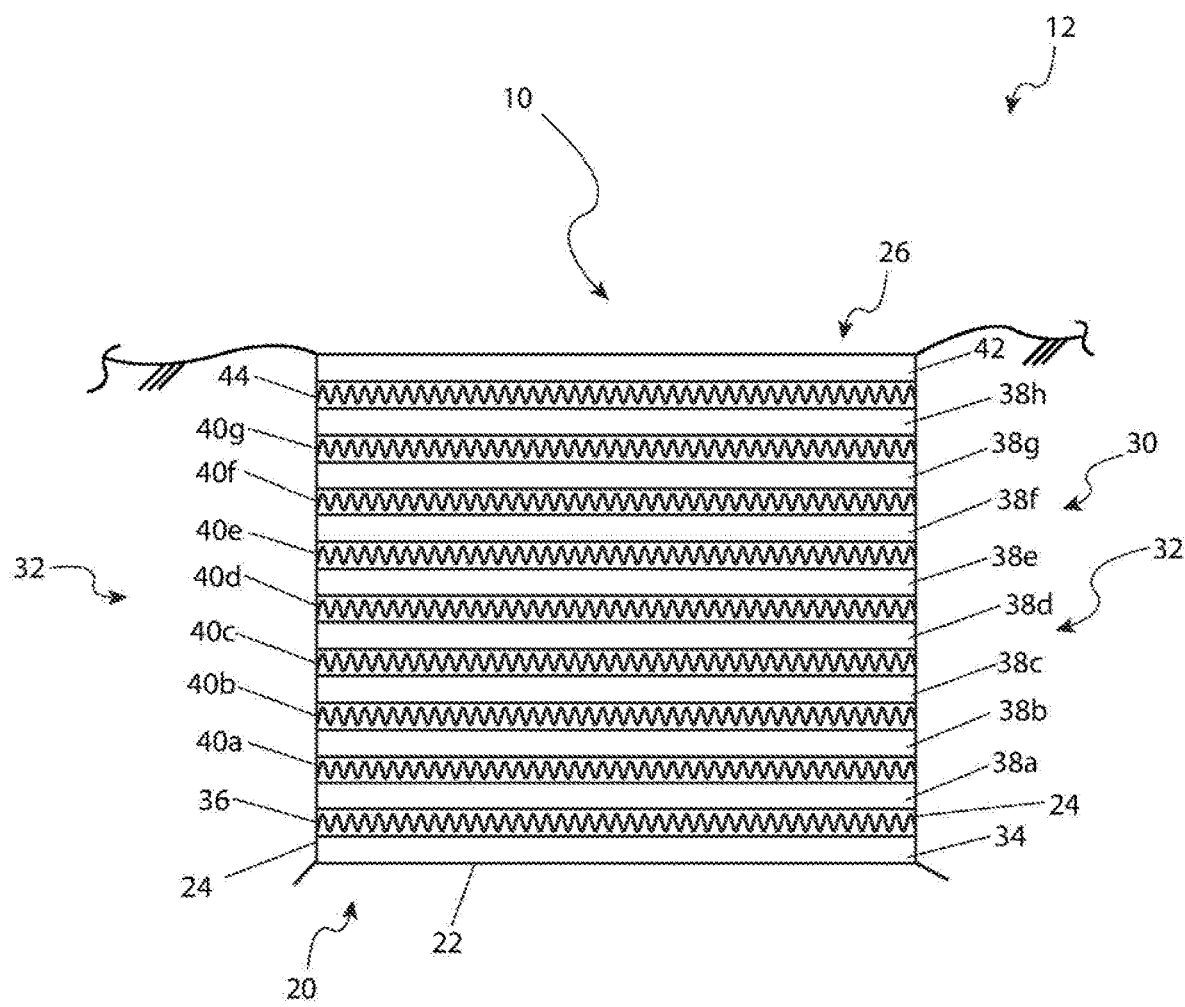
FIG. 4 is a side cross-sectional view of another example of the compost heap.

FIG. 1 is a flow diagram illustrating the disclosed method 100, according to an exemplary embodiment. FIG. 2 is a schematic block diagram of a composting environment 12 for the compost heap 10 produced by the disclosed method 100, according to an exemplary embodiment. FIG. 3 is a schematic cutaway top view illustrating one (1) example of the compost heap 10, according to one (1) embodiment. FIG. 4 is schematic side cross-sectional view illustrating another example of the compost heap 10, according to another embodiment.

FIG. 1 and the accompanying disclosure describe the operations of the disclosed method 100. The blocks illustrated in FIG. 1 represent operations. The various blocks do not imply any particular order or dependency. The operations set forth herein should not be interpreted as necessarily determining a sequence in which the operations are to be performed, unless specifically identified otherwise. Rather, although one illustrative order is indicated, it is to be understood that the sequence of the operations may be modified when appropriate. Blocks represented by dashed lines indicate alternative operations. Modifications, additions and/or omissions may be made to the operations illustrated and certain operations may be performed in a different order or simultaneously. Additionally, those skilled in the art will appreciate that not all of the operations illustrated need be performed in every embodiment of the disclosed method 100.

FIG. 2 and the accompanying disclosure describe the elements of the disclosed compost heap 10. The blocks illustrated in FIG. 2 represent elements. The elements set forth herein should not be interpreted as necessarily limiting structure, unless specifically identified herein. It is understood that not all relationships among the various disclosed elements are necessary represented. One (1) or more elements may be omitted from a particular example without departing from the scope of the present disclosure. Those skilled in the art will appreciate that some of the elements illustrated in FIG. 2 may be combined in various ways without the need to include other elements described in FIG. 2, other drawing figures, and/or the accompanying disclosure, even though such combinations are not explicitly illustrated herein. Similarly, additional elements, not limited to the examples presented, may be combined with some or all of the elements shown and described herein.

Referring to FIG. 2, in an exemplary embodiment, the disclosed composting environment 12 includes an underground cell 20 and the disclosed compost heap 10. The underground cell 20 may also be referred to as a window, which consists of bedding materials for worms 54 to live in and acts as a large bin to which the organic waste material 48 is added. Thus, the disclosed method 100 may be referred to as a window method and the composting environment 12 may be referred to as a window composting system. The underground cell 20 may be formed, for example digging or other excavating technique, within a ground surface 50. In an example, the underground cell 20 includes a bottom 22, sidewalls 24 and an open top 26.

The compost heap 10 includes a plurality of bedding material layers 30, also referred to herein as bedding layers, and a plurality of organic waste material layers 32, also referred to herein as organic waste layers. The bedding layers 30 and the organic waste layers 32 are arranged in an alternating layered to stacked configuration.

In one (1) example, the compost heap 10 includes a base bedding layer 34 layered on the bottom 22 within the underground cell 20. A bottom organic waste material layer 36 is layered on the base bedding material layer 34. A stack 32 of one or more intermediate bedding layers 38 and one or more intermediate organic waste layers 40, alternating between an intermediate bedding layer 38 and an intermediate organic waste layer and, is layered on the base bedding layer 34. A top bedding layer 42 is layered on a top organic waste layer 44 of the stack 32 of the intermediate bedding layers 38 and the intermediate organic waste layers 40.

Water 52 is dispersed through the top bedding layer 42, the top organic waste layer 44, the intermediate bedding layers 38, the intermediate organic waste layers 40, the bottom organic waste layer 36 and the base bedding layer 34. The water 52 moistens the compost heap 10 and enables the worms 54 to decompose the organic waste material 48 and the bedding material 46. The amount of water 52, for example, dispensed at the predetermined watering cycle may vary and depend on numerous factors such as the size or capacity of the underground cell 20, the overall time required to produce the compost 14, the time of year, the geographic area where the compost heap 10 is located and the like. Generally, water 52 is added until the compost heap 10 has the consistency of a damp sponge.

Worms 54 are dispersed through the top bedding layer 42, the top organic waste layer 44, the intermediate bedding layers 38, the intermediate organic waste layers 40, the bottom organic waste layer 36 and the base bedding layer 34. The worms 54 break down the organic waste material 48 and the bedding material 46 to produce decomposed organic material, decomposed bedding material and vermicast.

Referring to FIG. 1, and with reference to FIG. 2, in the exemplary embodiment, the disclosed method 100 begins by providing an underground cell 20 (block 102). The base bedding layer 34 is layered on the bottom 22 of the underground cell 20 (block 104). The bottom organic waste layer 36 is then layered on the base bedding layer 34 (block 106). The stack 32 of one or more intermediate bedding layers 38 and one or more intermediate organic waste layers 40, alternating between an intermediate bedding layer 38 and an intermediate organic waste layer 40, are layered on the bottom organic waste layer 36 to partially form the compost heap 10 (block 108). The top bedding layer 42 is layered on the top organic waste layer 44 of the stack 32 of intermediate bedding layers 38 and intermediate organic waste layers 40 to form the compost heap 10.

The compost heap 10 is watered (e.g., the water 52 is dispensed on and dispersed throughout the compost heap 10 via gravity) at a predetermined watering cycle (block 112). In the various embodiments of the disclosed method 100, the predetermined watering cycle may vary depending upon various factors including, for example, the size or capacity of the underground cell 20, the overall time required to produce the compost 14, the time of year, the geographic area where the compost heap 10 is located, the predetermined aeration cycle and the like. As an example, the predetermined watering cycle is at least once a day. As another example, the predetermined watering cycle is more than once a day. As another example, the predetermined watering cycle is once every other day. As another example, the predetermined watering cycle is at least once every week. As yet another example, the predetermined watering cycle is less than once every week.

The worms 54 are introduced into and dispersed throughout the compost heap 10 (block 114). In the various embodiments of the disclosed method 100 and the disclosed compost heap 10, various types of worms 54 may be used to decompose the organic waste material 48 and the bedding material 46 depending upon various factors including, but not limited to, the size (e.g., depth) of the underground cell 20, the overall time available to produce the compost 14, the time of year, the geographic area where the compost heap 10 is located, the predetermined watering cycle, the predetermined aeration cycle and the like. As one (1) specific, non-limiting example, the worms 54 are red wiggler worms (*Eisenia fetida* or *Eisenia andrei*). As another specific, non-limiting example, the worms 54 are red earthworms (*Lumbricus rubellus*). As another specific, non-limiting example, the worms 54 are European nightcrawlers (*Eisenia hortensis*). As another specific, non-limiting example, the worms 54 are African nightcrawlers (*Eudrilus eugeniae*). As another specific, non-limiting example, the worms 54 are Canadian nightcrawlers. (*Lumbricus terrestris*). As yet another specific, non-limiting example, the worms 54 are blueworms (*Perionyx excavatus*). Other types of worms 54 are also contemplated.

In the various embodiments of the disclosed method 100 and the disclosed compost heap 10, various amounts of worms 54 may be used to decompose the organic waste material 48 and the bedding material 46 depending upon various factors including, but not limited to, the size (e.g., depth) of the underground cell 20, the overall time available to produce the compost 14, the time of year, the geographic area where the compost heap 10 is located, the predetermined watering cycle, the predetermined aeration cycle and the like. As one (1) specific, non-limiting example, approximately one pound of worms 54 is added per one square yard (1 lb/yd.sup.2) of the compost heap 10.

The compost heap 10 is aerated at a predetermined aeration cycle (block 116). In the various embodiments of the disclosed method 100, the predetermined aeration cycle may vary depending upon various factors including, for example, the size or capacity of the underground cell 20, the overall time required to produce the compost 14, the time of year, the geographic area where the compost heap 10 is located, the predetermined watering cycle and the like. As an example, the predetermined aeration cycle is at least once a day. As another example, the predetermined aeration cycle is once every other day. As another example, the predetermined aeration cycle is at least once every week. As another example, the predetermined aeration cycle is once two (2) weeks. As another example, the predetermined aeration cycle is once three (3) weeks. As another example, the predetermined aeration cycle is once every month. As yet another example, the predetermined aeration cycle more than (4) weeks.

The aerating step (block 116) may be performed in various different ways and according to various different techniques. As an example, a relatively small compost heap 10 may be aerated with a pitchfork, a hoe, a shovel or another hand tool. As another example, a relatively large compost heap 10 may be aerated with a backhoe or other mechanism.

When ready, compost 14 from the compost heap 10 is then harvested (block 118). The compost 14 includes decomposed organic waste material 48, decomposed bedding material 46 and vermicast. Generally, the compost 14 is ready for harvest when it contains few-to-no scraps of undecomposed organic waste material 48 or bedding material 46. As one (1) example, the compost 14 is ready for harvest when the compost heap 10 is approximately one-tenth (1/10) of its original volume.

In another embodiment, additional organic waste material 48 may be added to the compost heap 10 over time, for example, as the initial volume of organic waste material 48 decomposes and the overall volume of the compost heap 10 is reduced or as compost 14 is harvested from the compost heap 10. In this embodiment, another stack 32 of one (1) or more additional intermediate bedding layers 38 and one (1) or more intermediate organic waste layers 40, alternating between an additional intermediate bedding layer 38 and an additional intermediate organic waste layer 40, is layered on the top bedding layer 42 to increase the volume of the compost heap 10, for example, by adding more organic waste material 48 (block 120). Another top bedding layer 42 is then layered on another top organic waste layer 44 of the another stack 32 of the additional intermediate bedding layers 38 and additional intermediate organic waste layers 40 to form the compost heap 10, for example, to refresh the compost heap 10 (block 122).

The compost heap 10 is then re-watered as necessary, for example, at the predetermined watering cycle (block 112). Additional worms 5, if needed, are introduced into and dispersed throughout the compost heap 10 (block 114). The compost heap 10 is aerated at a predetermined aeration cycle (block 116). When ready, compost 14 from the compost heap 10 is then harvested (block 118).

In another embodiment, optionally, one or more of the bedding layers 30, for example, one (1) or more of the base bedding layer 34, any or all of the intermediate bedding layers 38 and/or the top bedding layer 42, is soaked in water 52 until completely saturated (block 124). Pre-soaking the bedding layers 30 provides a more thorough saturation of the compost heap 10.

The disclosed method 100 enables formation of and increases to the compost heap 10 throughout the entire calendar year. Thus, in another embodiment, the disclosed method 100 may enable formation of the compost heap 10 in cold weather or during winter months, for example, when snow accumulates on the ground surface 50. In this embodiment, the snow is allowed to accumulate on the top bedding layer 42 (block 126). The snow is them removed from the top bedding layer 42 (block 128). Additional organic waste material 48 may be then added to the compost heap 10 during this time. In this embodiment, another stack 32 of one (1) or more additional intermediate bedding layers 38 and one (1) or more intermediate organic waste layers 40, alternating between an additional intermediate bedding layer 38 and an additional intermediate organic waste layer 40, is layered on the top bedding layer 42 to increase the volume of the compost heap 10, for example, by adding more organic waste material 48 (block 120). Another top bedding layer 42 is then layered on another top organic waste layer 44 of the another stack 32 of the additional intermediate bedding layers 38 and additional intermediate organic waste layers 40 to form the compost heap 10, for example, to refresh the compost heap 10 (block 122). The snow is then replaced on the another top bedding layer 42 (block 130). The snow, being replaced back on the another top bedding layer 42, acts as an insulator to keep the compost heap 10 warm throughout the cold months, which in turn, helps to keep the worms 54 alive during this time.

The winter months do not require water 52 or worms 54. When the weather warms, for example, during spring months, the compost heap 10 is watered at the predetermined watering cycle (block 112). Further, the melting snow may provide the water 52, or additional water 52, to the compost heap 10. Once spring arrives, the snow will slowly melt, soaking the compost heap 10, which in turn, will provide optimal conditions for adding the worms 54. Additional worms 54, if needed, are introduced into and dispersed throughout the compost heap 10 (block 114). The compost heap 10 is aerated at a predetermined aeration cycle (block 116). When ready, compost 14 from the compost heap 10 is then harvested (block 118).

Referring to FIGS. 3 and 4, and with reference to FIG. 1, in an example, the bottom 22 of the underground cell 20 is approximately horizontal, for example, is formed approximately horizontally. In another example, the bottom 22 of the underground cell 20 is disposed at a non-zero angle relative to horizontal, for example, is formed at the non-zero angle relative to horizontal. As an example, the non-zero angle is sufficient to allow water 52 to flow through the compost heap 10 in a generally horizontal direction.

Referring to FIGS. 3 and 4, and with reference to FIG. 1, in various embodiments, the underground cell 20 may be formed in various different sizes, for example, from a relatively small underground cell 20 (e.g., for residential use) to a relatively large underground cell 20 (e.g., for commercial use). In the example of a small underground cell 20 (e.g., a small composting environment 12), the organic waste material 48 may include kitchen and garden waste, such as kitchen scraps, fruits and vegetables, vegetable and fruit peels and ends, coffee grounds and filters, tea bags, grains such as bread, cracker and cereal, eggshells, leaves and grass clippings and the like. In the example of a large underground cell 20 (e.g., a large composting environment 12), the organic waste material 48 may include dairy cow or pig manure, sewage sludge, brewery waste, cotton mill waste, agricultural waste, food processing and grocery waste, cafeteria waste, grass clippings and wood chips and the like.

Additionally, in various embodiments, the underground cell 20 may have various different shapes. As examples, the underground cell 20 may be circular in cross section and cylindrical when viewed from the side, square in cross section and square when viewed from the side or various other geometric shapes. As one (1) specific, non-limiting example, the underground cell includes a width at least approximately ten feet (10 ft), a length of at least approximately ten feet (10 ft) and a depth of at least approximately ten feet (10 ft). As another specific, non-limiting example, the underground cell includes a width at least approximately twenty feet (20 ft), a length of at least approximately twenty feet (20 ft) and a depth of at least approximately twenty feet (20 ft). Other dimensions are also contemplated depending upon implementation of the composting environment 12.

Referring to FIGS. 3 and 4, and with reference to FIG. 1, in another embodiment, the composting environment 12 also includes one (1) or more excavating lanes 28 positioned adjacent to the open top 26 of the 26 of the underground cell 20. The excavation lane 28 provides access to the underground cell 20 and the compost heap 10, for example, to add additional organic waste material 48 to the compost heap 10, harvest compost 14 from the compost heap 10 and the like, without interfering with and applying undue pressure on the top of the compost heap 10, which may kill the worms 54. As an example, the excavation lane 28 may be at least approximately eight feet (8 ft) wide to accommodate a tractor, a truck or another vehicle that may be used to add organic waste material 48 or harvest compost 14.

Referring to FIG. 1, the bedding layers 30, for example, one (1) or more of the base bedding layer 34, any or all of the intermediate bedding layers 38 and/or the top bedding layer 42 is made of a bedding material 46. In an example, the bedding material 46 is cardboard, for example, single layer cardboard or multiple layer corrugated or uncorrugated cardboard. For example, one (1) or more of the base bedding layer 34, any or all of the intermediate bedding layers 38 and/or the top bedding layer 42 may include or be formed from one (1) or more planar sheets of cardboard. In another example, the bedding material 46 is paper. For example, one (1) or more of the base bedding layer 34, any or all of the intermediate bedding layers 38 and/or the top bedding layer 42 may include or be formed from one (1) or more planar sheets of paper. In yet another example, the bedding material 46 is a combination of cardboard and paper. For example, one (1) or more of the base bedding layer 34, any or all of the intermediate bedding layers 38 and/or the top bedding layer 42 may include or be formed from one (1) or more planar sheets of cardboard and one (1) or more planar sheets of paper.

Referring to FIG. 4, and with reference to FIG. 1, in various embodiments, the compost heap 10 may have any number of bedding layers 30 and/or organic waste layers 32. The total number of bedding layers 30 and/or organic waste layers 32 may depend on various factors including the size or capacity of the underground cell 20, the overall time required to produce the compost 14, the time of year, the geographic area where the compost heap 10 is located and the like. As an example, the bedding layers 30 (e.g., the base bedding layer 34, any intermediate bedding layers 38 and the top bedding layer 42) and the organic waste layers 32 (e.g., the bottom organic waste layer 36, any intermediate organic waste layers 40 and the top organic waste layer 44) forming the compost heap 10 may number a total of between ten (10) layers and twenty (20) layers. As another example, the bedding layers 30 and the organic waste layers 32 forming the compost heap 10 may number a total of between ten (1) layers and twelve (12) layers. As another example, the bedding layers 30 and the organic waste layers 32 forming the compost heap 10 may number a total of at least ten (1) layers. As yet another example, the bedding layers 30 and the organic waste layers 32 forming the compost heap 10 may number a total of more than twenty (20) layers.

FIGS. 3 and 4 more clearly illustrate the alternating stack of the bedding layers 30 and the organic waste layers 32 forming the compost heap 10. As shown, the base bedding layer 34 is layered on the bottom 22 of the underground cell 20. The bottom organic waste layer 36 is layered on the base bedding layer 34. A plurality of intermediate bedding layers 38a-38h and a plurality of organic waste layers 40a-40g are layered on the bottom organic waste layer 36 and on each other in an alternating arrangement. The top bedding layer 42 is layered on the top organic waste layer 44.

Referring to FIG. 1, in various embodiments, the amount of organic waste material 48 forming each of the organic waste layers 32 (e.g., the bottom organic waste layer 36, any or all of the intermediate organic waste layers 40 and the top organic waste layer 44), for example, the thickness of the organic waste layers 32, may vary depending on various factors, including, for example, the size or capacity of the underground cell 20, the overall time required to produce the compost 14, the time of year, the geographic area where the compost heap 10 is located and the like. As an example, one (1) or more of the organic waste layers 32 (e.g., the bottom organic waste layer 36, any intermediate organic waste layers 40 and/or the top organic waste layer 44) forming the compost heap 10 may have a thickness of between approximately one-half inch (½ in) and one inch (1 in). As another example, one (1) or more of the organic waste layers 32 forming the compost heap 10 may have a thickness of between approximately one-half inch (½ in) and five inches (5 in). As another example, one (1) or more of the organic waste layers 32 forming the compost heap 10 may have a thickness of between approximately five inches (5 in) and one foot (1 ft). As another example, one (1) or more of the organic waste layers 32 forming the compost heap 10 may have a thickness of between approximately one foot (1 ft) and two feet (2 ft). As yet another example, one (1) or more of the organic waste layers 32 forming the compost heap 10 may have a thickness of more than approximately two feet (2 ft).

Referring to FIG. 3, and with reference to FIG. 1, in another example embodiment, the organic waste layers 32 and the bedding layers 30 overlap each other in a slight sloping fashion that will allow water 52 to run off.

Referring to FIG. 1, in another embodiment, the water 52 is applied (block 112) to the compost heap 10 after layering of each individual bedding material layer 30 and organic waste layer 32 is performed (blocks 104, 106, 108, 110, 120, 122). Further, the layering of each individual bedding material layer 30 and organic waste layer 32 (blocks 104, 106, 108, 110, 120, 122) is performed in such a manner so that there is space enough for air to flow between the adjacent layers. This may also allow for mold, worms, and bacteria to get between the bedding material layers 30 and organic waste layers 32.

Those skilled in the art will recognize that the worms 54 (e.g., the red wiggler worms) need to have a location to go when temperatures are frigid, this is why it is necessary to aerate the compost heap 10 and the soil where the compost heap 10 will lie (e.g., the bottom 22 of the underground cell 20).

Those skilled in the art will recognize that other styles and configurations of the disclosed apparatus 10 can be easily incorporated into the teachings of the present disclosure, and only particular configurations have been shown and described for purposes of clarity and disclosure and not by way of limitation of scope.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A composting method comprising:
   layering a base bedding material on a ground surface;
   layering a bottom organic waste material layer on said base bedding material layer;
   layering a stack of one or more intermediate bedding material layers and one or more intermediate organic waste material layers, alternating between an intermediate bedding material layer and an intermediate organic waste material layer, on said bottom organic waste material layer to partially form a compost heap;
   layering a top bedding material layer on a top organic waste material layer of said stack of said intermediate bedding material layers and said intermediate organic waste material layers to form said compost heap;
   watering said compost heap at a watering cycle;
   introducing worms to said compost heap; aerating said compost heap at an aeration cycle; and,
   harvesting compost from said compost heap, said compost comprising decomposed organic waste material, decomposed bedding material and vermicast.

2. The method of claim 1, further comprising:
   layering another stack of one or more additional intermediate bedding material layers and one or more one or more additional intermediate organic waste material layers, alternating between an additional intermediate bedding material layer and an additional intermediate organic waste material layer, on said top bedding material layer to increase a volume of said compost heap; and,
   layering another top bedding material layer on another top organic waste material layer of said another stack of said additional intermediate bedding material layers and additional intermediate organic waste material layers to form said compost heap.

3. The method of claim 1, further comprising soaking said base bedding material layer, said intermediate bedding material layers and said top bed layer in water until completely saturated before layering.

4. The method of claim 1, further comprising:
   allowing snow to accumulate on said top bedding material layer;

removing said snow from said top bedding material layer;

layering another stack of one or more additional intermediate bedding material layers and one or more one or more additional intermediate organic waste material layers, alternating between an additional intermediate bedding material layer and an additional intermediate organic waste material layer, on said top bedding material layer to increase a volume of said compost heap; and, layering another top bedding material layer on another top organic waste material layer of said stack of said additional intermediate bedding material layers and additional intermediate organic waste material layers to form said compost heap; and, replacing said snow on said another top bedding material layer.

5. The method of claim 1, wherein each of said base bedding material layer, said intermediate bedding material layers and said top bedding material layer comprises one or more planar sheets of cardboard and one or more sheets of paper, or combinations thereof.

6. The method of claim 1, wherein said base bedding material layer, said bottom organic waste material layer, said intermediate bedding material layers, said intermediate organic waste material layers, said top organic waste material layer and said top bedding material layer number a total of between approximately ten layers and twelve layers.

7. The method of claim 1, wherein each of said bottom organic waste material layer, said intermediate organic waste material layers and said top organic waste material layer comprise a thickness of between approximately one-half inch and approximately one inch.

8. The method of claim 1, wherein said watering cycle comprises watering at least once a day.

9. The method of claim 1, wherein said aeration cycle comprises aerating at least once every three weeks.

10. The method of claim 1, wherein said worms comprise red wiggler worms.

11. The method of claim 1, wherein introducing said worms comprises providing approximately one pound of said worms per square yard of said compost heap.

12. The method of claim 1, wherein harvesting said compost from said compost heap occurs when said compost heap is approximately one-tenth of its original volume.

13. The method of claim 1, further providing an underground cell and comprises forming a bottom thereof approximately horizontally.

14. The method of claim 13, wherein providing said underground cell comprises forming said bottom at a non-zero angle relative to horizontal.

15. The method of claim 14, wherein said non-zero angle is sufficient to allow said water to flow through said compost heap in a generally horizontal direction.

16. The method of claim 1, further comprising the additional step of providing an underground cell in said ground surface and forming sidewalls thereof approximately vertically.

17. The method of claim 16, wherein said underground cell comprises a width at least approximately ten feet, a length of at least approximately ten feet and a depth of at least approximately ten feet.

18. The method of claim 17, further comprising forming at least one excavation lane adjacent to said underground cell to provide access to said compost heap.

* * * * *